(No Model.)
G. V. G. LAPSOLU.
PNEUMATIC TIRE.
No. 496,571. Patented May 2, 1893.
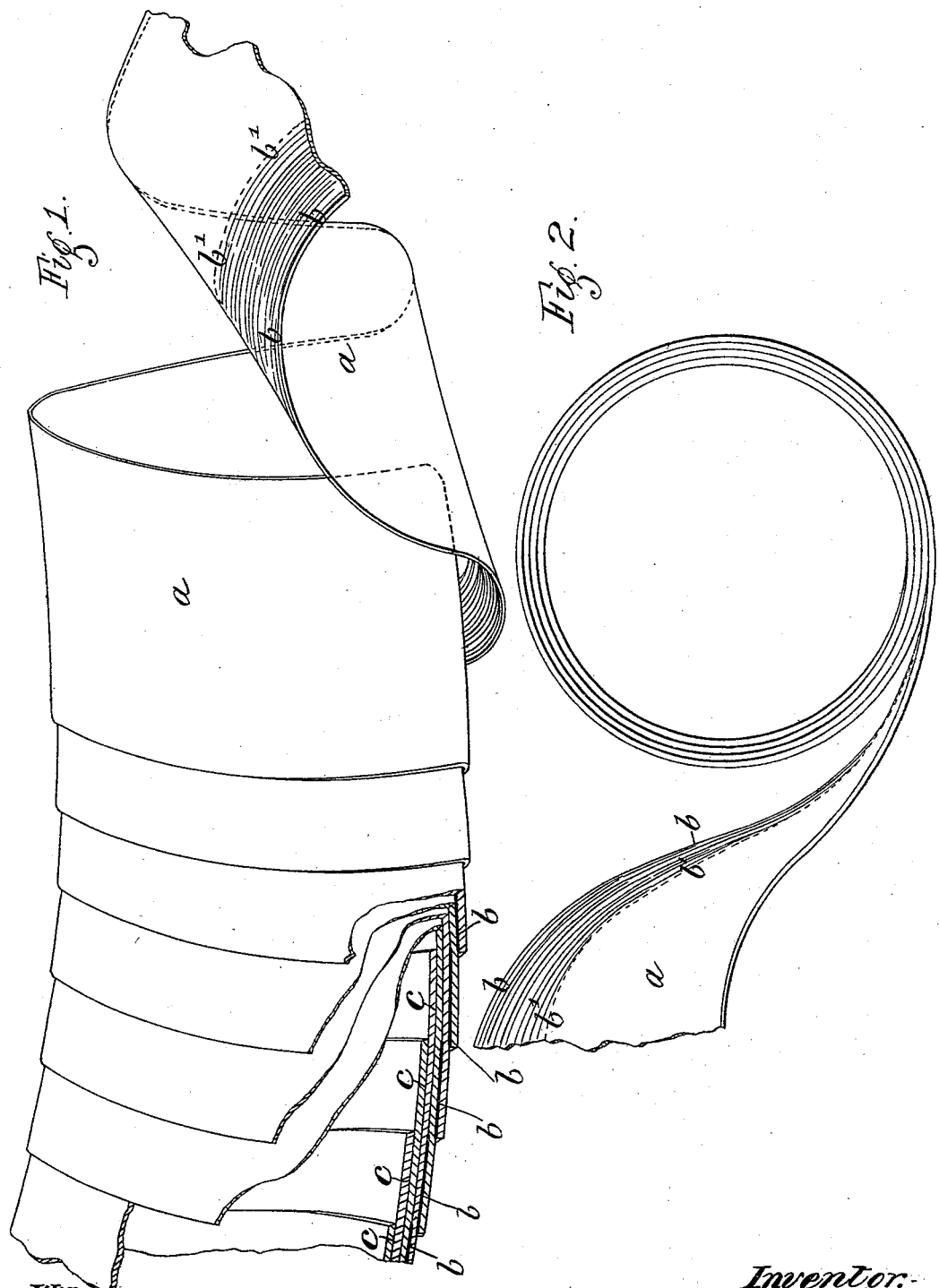
Witnesses:
J. H. Titlar.
C. Lundgren
Inventor:
Georges Victor Gustave Lapsolu
by attorneys
Brown & Seward
THE NORRIS PETERS CO., PHOTO-LITHO., WASHINGTON, D. C.

UNITED STATES PATENT OFFICE.

GEORGES VICTOR GUSTAVE LAPSOLU, OF PARIS, FRANCE.

PNEUMATIC TIRE.

SPECIFICATION forming part of Letters Patent No. 496,571, dated May 2, 1893.

Application filed December 27, 1892. Serial No. 456,342. (No model.)

*To all whom it may concern:*

Be it known that I, GEORGES VICTOR GUSTAVE LAPSOLU, a citizen of the French Republic, residing at Paris, France, have invented a new and useful Improvement in Pneumatic Tires for the Wheels of Velocipedes and other Vehicles, of which the following is a specification.

Numerous attempts have been made to prevent the disinflation or collapse of the air chamber of pneumatic tires applied to velocipede wheels which is frequently produced when the cyclist encounters on his road any cutting or perforating body but the means heretofore devised for this purpose have not been very successful.

According to my invention I form the chamber of the tire of a strip of supple elastic material rolled or coiled up in a helix with the successive coils overlapping the preceding ones to form a tube and I produce the adhesion of only one of the edges and a portion of the width of the strip upon the part previously rolled or coiled up leaving one edge and a portion of the width of the strip inadherent and free in the several lapping coils. By this mode of construction of the chamber, provided the proper relation between the width of the strip and the pitch of the helix is determined, the wall of the chamber may be made at all points of the same number of thicknesses superposed in such manner that there is liberty for all the thicknesses, except the most external one, to displace themselves by slipping relatively to each other in the tube when the tube is pressed out of its normal shape as it always is at the bearing point of the tire which is where a nail or other pointed or sharp body would act upon it, the elasticity of the superposed thicknesses causing them to return to their normal helical relation to each other after they have been relieved from the pressure of the load, and to retain themselves in this relation in all other parts of the tire but that which is pressed out of shape by the load. By reason of this faculty which the helical strips constituting my chamber have of being displaced when a nail or other obstacle presents itself in the way of the velocipede to which it is applied the superposed thicknesses may be all pierced but each one of them will not be pierced until after having been first displaced relatively to the thickness pierced before it; it thus results that the different thicknesses will be pierced respectively in points which do not coincide after the nail has been extracted and the strips have returned to their normal positions. The nail will not then produce in the wall a continuous hole capable of opening a communication between the interior and the exterior of the air chamber and consequently the passage of air need not be feared. The efficacy of the system will be the greater in proportion as the rolled strips constituting the chamber may be of a material more supple and more elastic and therefore I employ by preference for this purpose india rubber of the most pure and best quality.

In order to facilitate the slipping I propose to apply at the interior of the chamber a lubricating material such as soapsuds, glycerine either pure or diluted with water, &c.; glycerine presents the advantage of being uncongealable.

Figure 1 of the accompanying drawings represents on a scale considerably larger than ordinary size a longitudinal view of a portion of a tube or air chamber constructed according to my invention, the helical coils of the strip being represented at one end of the figure as partly broken away and in section to show their adherent and inadherent lapping and the strip being shown partly uncoiled at the other end. Fig. 2 is an end view as seen from the right of Fig. 1.

Briefly stated the tube of which my air chamber is composed is made by merely rolling up a strip of rubber helically with some cement upon a portion of the width of its internal surface.

In the drawings, *a* designates the strip of rubber.

*b b'* indicate the edge and adjacent portion of the width of the strip to which the cement is applied, the cement being indicated in the uncoiled portion of the strip by line shading and being also indicated by heavy black lines *b* between the coils of the completed tube where it is shown in section in Fig. 1, in which figure the inadherent free edges and lapping portions of the strip are indicated by lighter lines *c*.

The number of thicknesses of material in the walls of the tube will be determined by the relative width of the strip and the pitch given to the helical winding. In the example shown there are four thicknesses in every part.

In the manufacture of the tire the cement may be applied before or during the rolling or coiling.

What I claim as my invention, and desire to secure by Letters Patent, is—

An air chamber for the tires of wheels for velocipedes or other vehicles constituted substantially as herein described by a strip of supple elastic material rolled or coiled up in helical form with its edges lapping to form a tube whose walls are composed at all points of several thicknesses of material, one of the edges only and an adjacent portion of the width of the strip being adherent to the underlying portions and the other edge and the adjacent portion of the width being inadherent and free, substantially as herein set forth.

In witness whereof I have hereunto set my hand in the presence of two subscribing witnesses.

GEORGES VICTOR GUSTAVE LAPSOLU.

Witnesses:
ROBT. M. HOOPER,
HENRY THIESSE.